US012586340B2

(12) United States Patent
Wang

(10) Patent No.: US 12,586,340 B2
(45) Date of Patent: Mar. 24, 2026

(54) PIXEL PERSPECTIVE ESTIMATION AND REFINEMENT IN AN IMAGE

(71) Applicant: Lemon Inc., Grand Cayman (KY)

(72) Inventor: Peng Wang, Los Angeles, CA (US)

(73) Assignee: Lemon Inc., Grand Cayman (KY)

( * ) Notice: Subject to any disclaimer, the term of this patent is extended or adjusted under 35 U.S.C. 154(b) by 442 days.

(21) Appl. No.: 18/175,738

(22) Filed: Feb. 28, 2023

(65) Prior Publication Data

US 2024/0290061 A1 Aug. 29, 2024

(51) Int. Cl.
| *G06V 10/32* | (2022.01) |
| *G06T 7/11* | (2017.01) |
| *G06T 7/12* | (2017.01) |
| *G06T 7/70* | (2017.01) |

(52) U.S. Cl.
CPC ............... *G06V 10/32* (2022.01); *G06T 7/11* (2017.01); *G06T 7/12* (2017.01); *G06T 7/70* (2017.01)

(58) Field of Classification Search
CPC ... G06T 7/13; G06T 7/11; G06T 2207/20081; G06V 10/82; G06V 10/44; G06V 10/25
See application file for complete search history.

(56) References Cited

U.S. PATENT DOCUMENTS

| 2005/0025357 | A1* | 2/2005 | Landwehr | ............. | A01M 3/005 |
| | | | | | 382/224 |
| 2020/0125234 | A1* | 4/2020 | Lee | ......................... | G06F 18/21 |
| 2020/0301013 | A1* | 9/2020 | Banerjee | ............... | G01S 17/931 |

FOREIGN PATENT DOCUMENTS

WO     WO-2024124653 A1 *   6/2024      ............. G06T 19/20

OTHER PUBLICATIONS

Hubner, Patrick, et al. "Pose normalization of indoor mapping datasets partially compliant with the manhattan world assumption." Remote Sensing 13.23 (2021): 4765. (Year: 2021).*
(Continued)

*Primary Examiner* — Emily C Terrell
*Assistant Examiner* — Jacqueline R Zak
(74) *Attorney, Agent, or Firm* — Fish & Richardson P.C.

(57) ABSTRACT

A method and network for refining pixels in an image are provided. The method includes determining principle directions of a pixel in the image and determining a normal direction of the pixel in the image. The method further includes segmenting regions in the image as one or more horizontal regions and one or more vertical regions based on the normal direction of the pixel and obtaining global normalization information for the image from the segmented regions. The method also includes refining the principle directions of the pixel in the image based on the global normalization information. A method is also provided for determining perspective directions of pixels in the image.

20 Claims, 6 Drawing Sheets

(56) References Cited

OTHER PUBLICATIONS

Huang, Jingwei, et al. "Framenet: Learning local canonical frames of 3D surfaces from a single RGB image." Proceedings of the IEEE/CVF International Conference on Computer Vision. 2019. (Year: 2019).*

Bae et al., "Estimating and Exploiting the Aleatoric Uncertainty in Surface Normal Estimation", Computer Science, Computer Vision and Pattern Recognition, submitted Sep. 20, 2021.

Huang et al. "FrameNet: Learning Local Canonical Frames of 3D Surfaces from a Single RGB Image", Computer Science > Computer Vision and Pattern Recognition, submitted Mar. 29, 2019.

Lu et al., "2-Line Exhaustive Searching for Real-Time Vanishing Point Estimation in Manhattan World", 2017 IEEE Winter Conference on Applications of Computer Vision (WACV), Date Added to IEEE Xplore: May 15, 2017.

* cited by examiner

PIXEL PERSPECTIVE ESTIMATION AND REFINEMENT IN AN IMAGE

TECHNICAL FIELD

The embodiments described herein pertain generally to image synthesis in computer vision and graphics. More specifically, the embodiments described herein pertain to determining pixel directions in an image and refinement of pixel directions using a neural network.

BACKGROUND

Current state-of-art models for per-pixel coordinate estimation, e.g., pixel perspective directions, are not able to estimate principal directions for the pixels in both indoor and outdoor images. For example, FrameNet (Huang et al., FrameNet: Learning Local Canonical Frames of 3D Surfaces from a Single RGB Image, arXiv, 2019, (arxiv.org/pdf/1903.12305.pdf, accessed Jan. 16, 2023)), is a neural network model that may be used to predict per-pixel features, e.g., three-dimensional orthogonal coordinates, e.g., canonical frame represented by three orthogonal axes (in normal direction and two in its tangent plane). Without wishing to be bound by theory, however, since FrameNet uses datasets with a fixed environment, on which it is easy to collect data, e.g., from the reconstruction of the indoor environment with a strong correlation/bias to the larger planar surfaces, such as walls and floors, the principal directions and ground truths of the pixels are not estimated well for images-in-the-wild, such as outdoor and nature images. Additionally, since the estimation of the principal directions in the FrameNet model is pixel-wise with local information, the placement of objects inside planar regions may be noisy, e.g., jittering. Such noise or jittering may result since FrameNet omits the use of a strong global correlation of the principal directions based on the global gravity of the image.

SUMMARY

Features in the embodiments disclosed herein provide a neural network framework or model that is configured to determine perspective directions of each pixel in an image which may be used for processing both indoor and outdoor images. In an embodiment, the neural network model may be configured to determine the three-dimensional principal directions for each pixel in the image, specifically, the horizontal principal direction $[x \in SO_3]$ and vertical principal direction $[y \in SO_3]$ and/or a normal direction. The neural network model may also be configured to generate ground truth labeling for the principal directions and/or the normal directions for images-in-the-wild, which may be used to train the neural network. As such, the neural network model may be configured to determine the perspective directions and/or the principal directions from any type of image, including, but not limited to, indoor images, outdoor images, and nature images, and to project a virtual object anywhere in the image with the appropriate perspective, e.g., perspective of the pixel(s) with the virtual object.

In one example embodiment, a method is provided for refining pixels in an image. The method may include determining principal directions of a pixel in the image and determining a normal direction of the pixel in the image. The method may further include segmenting regions in the image as one or more horizontal regions and one or more vertical regions based on the normal direction of each pixel in the segmented regions and obtaining global normalization information for the image from the segmented regions. The method may also include refining the principal directions of the pixel in the image based on the global normalization information.

In another example embodiment, a method is provided for determining perspective directions of pixels in an image. The method may include receiving an image and generating two-dimensional geometric regions for objects in the image using a two-dimensional vanishing point estimation. The method may also include determining a virtual intrinsic for each geometric region based on image size of the object and determining a normal direction and principal directions for a pixel in the image based on the vanishing point estimation.

In yet another embodiment, a non-volatile computer-readable medium having computer-executable instructions stored thereon may be provided. The computer-readable medium, upon execution, may cause one or more processors to perform operations that include determining principal directions of a pixel in the image, determining a normal direction of the pixel in the image, segmenting regions in the image as one or more horizontal regions and one or more vertical regions based on the normal direction of each pixel in the segmented regions, obtaining global normalization information for the image from the segmented regions, and refining the principal directions of the pixel in the image based on the global normalization information.

In still another embodiment, a neural network for refining pixels in an image may be provided. The neural network may include an imaging module for receiving an image and a prediction module configured to determine principal directions of each pixel in the image and determine a normal direction and level of uncertainty of the determination of each pixel in the image. The neural network may further include a refinement module configured to segment regions in the image as one or more horizontal regions and one or more vertical regions based on the normal direction of each pixel, obtain global normalization information for the image from the segmented regions, and refine the principal directions of each pixel in the image based on the global normalization information, and a rendering module for rending a virtual object in the image having perspective directions of the pixel.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

DETAILED DESCRIPTION

Figure 1:
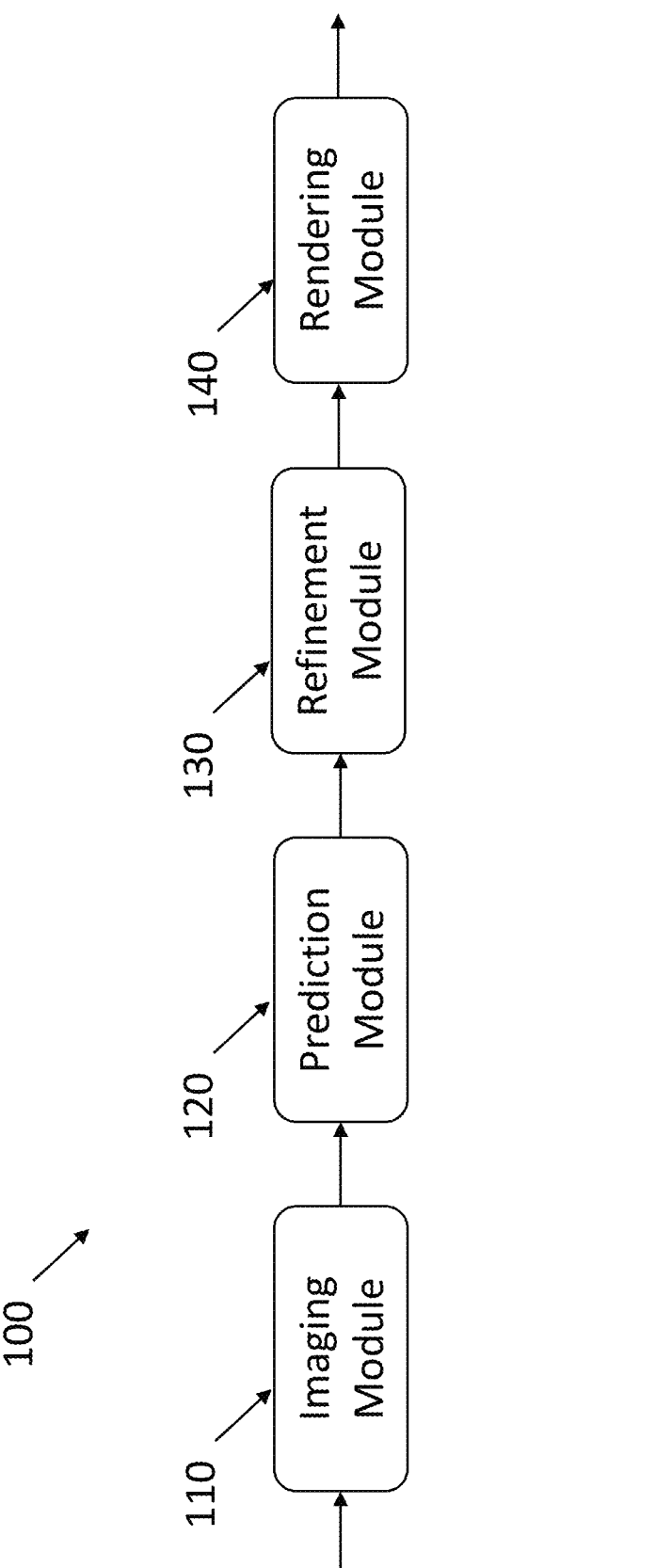
FIG. 1 illustrates an example model for refining pixels in an image, arranged in accordance with at least some embodiments described and recited herein.

In the following detailed description, particular embodiments of the present disclosure are described herein with reference to the accompanying drawings, which form a part of the description. In this description, as well as in the drawings, like-referenced numbers represent elements that may perform the same, similar, or equivalent functions, unless context dictates otherwise. Furthermore, unless otherwise noted, the description of each successive drawing may reference features from one or more of the previous drawings to provide clearer context and a more substantive explanation of the current example embodiment. Still, the example embodiments described in the detailed description, drawings, and claims are not intended to be limiting. Other embodiments may be utilized, and other changes may be made, without departing from the spirit or scope of the subject matter presented herein. It will be readily understood that the aspects of the present disclosure, as generally described herein and illustrated in the drawings, may be arranged, substituted, combined, separated, and designed in a wide variety of different configurations, all of which are explicitly contemplated herein.

It is to be understood that the disclosed embodiments are merely examples of the disclosure, which may be embodied in various forms. Well-known functions or constructions are not described in detail to avoid obscuring the present disclosure in unnecessary detail. Therefore, specific structural and functional details disclosed herein are not to be interpreted as limiting, but merely as a basis for the claims and as a representative basis for teaching one skilled in the art to variously employ the present disclosure in virtually any appropriately detailed structure.

Additionally, the present disclosure may be described herein in terms of functional block components and various processing steps. It should be appreciated that such functional blocks may be realized by any number of hardware and/or software components configured to perform the specified functions.

The scope of the disclosure should be determined by the appended claims and their legal equivalents, rather than by the examples given herein. For example, the steps recited in any method claims may be executed in any order and are not limited to the order presented in the claims. Moreover, no element is essential to the practice of the disclosure unless specifically described herein as "critical" or "essential".

In the present description and recitation, the following terms may be used, in addition to their accepted meaning, as follows.

As used herein, an "image" may refer to a static two-dimensional image, e.g., picture image, or frames from a video or augmented reality stream. The image may then be received by a pixel refinement model as discussed herein for pixel refinement.

As used herein, a "vanishing point" may refer to a point on an image plane of a perspective object in an image where two-dimensional perspective projections of mutually parallel lines in three-dimensional space appear to converge.

As used herein, a "ground truth" may refer to information that is known or pseudo-known, e.g., taken as known or true, to be compared with a predicted value or determination, for example, for supervised classification to determine accuracy and minimize errors.

As used herein, a "

principal direction" may refer to the orientation direction of a pixel in an image based on an intrinsic point for the image. While used herein the principal direction is related to the x-direction and y-direction of the pixel, it is understood that such disclosure is not intended to limit the scope of the disclosure. Rather, the principal directions may refer to other directions, including, but not limited to, other multi-dimensional directions, linear and non-linear directions, spatial or time oriented directions.

As used herein, a "cross product," which may be represented as "x," may refer to a binary operation on two vectors in a three-dimensional oriented Euclidean vector space, in which the vector is perpendicular to the two independent vectors, e.g., normal to the plane.

As referenced herein, "multilayer perceptron" or "MLP" may refer to a feedforward artificial neural network that may generate a set of outputs from a set of inputs. It is to be understood that an MLP may be characterized by several layers of input nodes connected as a directed graph between the input and output layers.

As referenced herein, a "model" or "framework" may refer to software, such as algorithms and/or programs, hardware or firmware, or any combination thereof that supports machine learning, natural language understanding, natural language processing, speech recognition, computer vision, etc.

As referenced herein, an "images-in-the-wild" may refer to uncontrolled imagery, as opposed to images taken in a controlled space with known coordinates, identifications, or classifications, e.g., three-dimensional meshes aligned with RGB images, such as from ScanNet. The images-in-the-wild may include outdoor images or nature images.

As referenced herein, a "neural network" may refer to a convolutional neural network that may include a collection of connected units or nodes or MLPs that process data, e.g., signals to the unit or node, and may include multiple layers, such as, an input layer, hidden layers, and an output layer. The neural network may be trained using a deep learning architecture which may be supervised, semi-supervised, or unsupervised.

As referenced herein, a "module" may refer to a network, algorithm, programs, hardware, or any combination thereof configured or otherwise provided to perform the recited function.

With the features in the embodiments disclosed herein, a pixel refinement model is provided that is configured to determine perspective directions of a pixel or each pixel in an image and refine the pixel principal directions of the pixel in the image to provide enhanced visual quality. As discussed herein, while not intending to limit the scope of the disclosure, in an embodiment, the pixel refinement model may be a neural network, such as, a convolutional neural network (CNN), that is configured to determine principal directions and/or normal direction with a level of uncertainty of the determination for the pixel in an image, which may be applied to both indoor images, as well as outdoor images, including nature images. The pixel refinement model may also be configured to adopt global information and refine the pixel principal directions in one or more horizontal and/or one or more vertical regions in the image based on a global normalization. In order to improve the image processing for the outdoor and nature images, the pixel refinement model may be trained from images-in-the-wild, in which the pixel refinement model may be configured to use a two-dimensional vanishing point detection strategy to produce pseudoground truth principal directions and normal directions for images-in-the-wild that may be used for such training. As such, the pixel refinement model is able to provide imaging results that have much better visual quality and estimations for virtual object insertion which have the correct pixel perspectives, for example, for virtual ad placement or animation in a static image, video, or augmented reality application.

FIG. 1 shows an example system in which a pixel refinement model 100 for refinement of pixels in an image may be implemented, arranged in accordance with at least some embodiments described and recited herein. The pixel refinement model 100 may be a neural network, such as, a convolutional neural network, used for image processing, which may include generating and/or determining pixel perspectives, pixel directions, ground truths, and pixel refinement. The pixel refinement model 100 may also be configured to insert virtual object(s) in the image. In an embodiment, the pixel refinement model 100 may be based on an EfficientNet framework, as taught in Bae et al., Estimating and Exploiting the Aleatoric Uncertainty in Surface Normal Estimation, arXiv:2109.09881, 2021 (https://doi.org/10.48550/arXiv.2109.09881, accessed Jan. 16, 2023), which is incorporated by reference. Once the pixel refinement model 100 has been trained, the pixel refinement model 100 may be deployed for inference. In an example embodiment, the pixel refinement model 100 may be a function, an operation, an action, an algorithm, an application, or the like that is implemented, designed, stored, executed, performed, or otherwise hosted in an electronic device (e.g., 600 of FIG. 6, etc.) such as a graphics processing unit ("GPU"), central processing unit ("CPU"), or other processor-enabled device, which may be a cloud-based network, a local device, or downloaded to the local device, a server, a smartphone, a tablet computer, a laptop computer, a desk computer, and/or any other suitable electronic device. Although illustrated as discrete components, various components may be divided into additional components, combined into fewer components, or eliminated altogether while being contemplated within the scope of the disclosed subject matter. It will be understood by those skilled in the art that each function and/or operation of the components may be implemented, individually and/or collectively, by a wide range of hardware, software, firmware, or any combination thereof.

As depicted in FIG. 1, the pixel refinement model 100 includes an imaging module 110, a prediction module 120, a refinement module 130, and a rendering module 140. The imaging module 110 may be configured to receive input data from a source. In an example embodiment, the source may be an electronic device (e.g., 600 of FIG. 6, etc.) including but not limited to a camera, a video recorder, a smartphone, a tablet computer, a laptop computer, a desk computer, and/or any other suitable electronic device. In another example embodiment, the source may be storage, a database, a file, or the like. The source may provide input data to the pixel refinement model 100. In an example embodiment, the input data may include an image, such as a static image or frame(s) from a video, an augmented reality video stream, etc. that is captured, generated, obtained, userentered, etc. via the source or that is stored in the source, which may be in two-dimensions or three-dimensions. The image may be transmitted or otherwise communicated from the source to a receiving component of the imaging module 110 via a wired or wireless network. Such network may be regarded as a medium that is provided as bidirectional communications link between the imaging module 110 and the source. The network may include the Internet, a local area network (AN), a wide area network (WAN), a local interconnect network (LIN), a localized cloud, etc. Further, any algorithm or program described, recited, or suggested herein may be executed by one or more processors hosted on input device source.

The imaging module 110 may refer to one or more components or modules that are designed, programmed, or otherwise configured to receive and process the image. In an example embodiment, the imaging module 110 may be configured to extract features, such as, objects, surfaces, or the like from the image. In an embodiment, the prediction module 120 may include an encoder-decoder framework that includes pixel-wise multi-layer perceptrons (MLPs) that are trained on a subset of pixels selected based on an estimated uncertainty, e.g., level or value of the uncertainty of the predicted value/coordinate. For example, in an embodiment, the imaging module 110 may include a convolutional encoder-decoder with skip-connections, e.g., neural network, that generates a plurality of feature maps from the image, e.g., from a single RGB image. The plurality of feature maps may be generated with different resolutions, e.g., low resolution, e.g., $\frac{1}{8}$ resolution, $\frac{1}{4}$ resolution, $\frac{1}{2}$ resolution, or the like. In an embodiment, a bin-width estimate block may be used to globally process the scene information, in which the bin width may change based on the predicted depth range of the image. The imaging module 110 may then be configured to output a single channel h×w depth image, e.g., at half the spatial resolution.

The prediction module 120 may refer to one or more components or modules that are designed, programmed, or otherwise configured to determine one or more of the normal direction with uncertainty, e.g., aleatoric uncertainty, and the principal directions for a pixel or each pixel in the image. In an embodiment, the prediction module 120 may be configured to determine the normal direction and the principal directions(s) simultaneously. While specific embodiments of methods or models configured to determine the normal direction with a level of uncertainty and principal directions are discussed below, it is understood that other methods or models may be used for determining the same, for example, FrameNet. In an embodiment, the prediction module 120 may include convolutional layer(s) that receives the feature map(s) from the imaging module 110 and is configured to make coarse predictions and/or refined predictions of e.g., normal directions, uncertainty, principal directions, e.g., x-direction and y-direction, for the pixels in the image. In an embodiment, the coarse prediction(s) may be made from a $\frac{1}{8}$ resolution feature-map using a 3×3 convolution layer, in which training loss is applied to all pixels. The prediction module 120 may then be configured to pass the coarse prediction through pixel-wise refinement modules that are configured to make predictions of size (H/2n×W/2n), and to output a refined prediction of size (H/n×W/n). In an embodiment, the prediction module 120 may be configured to bilinearly upsample both the prediction and feature map by a factor of 2, during training, selecting a subset of pixels based on the uncertainty, and estimating a refined output of the sampled pixels using a MLP with three hidden layers, each with 128 nodes and a non-linear activation function, e.g., rectified linear unit (ReLU) activation. The input to the MLP may be a concatenated vector of the pixel-wise feature and prediction. In an embodiment, during training, the loss may be calculated only for the sampled pixels, but at test time or inference, the trained MLPs are applied to all pixels.

In an embodiment, the prediction module 120 may be trained based on training data that includes images-in-the-wild, as discussed further below, in which the ground truth normal (and/or principal directions) may be compared with the predicted normal (and/or principal directions) with the associated predicted level of uncertainty to minimize training loss and/or the error for all the perspective directions for the pixel in the image. In an embodiment, the prediction module 120 may be configured to determine the per-pixel surface normal probability distribution by minimizing the negative log-likelihood (NLL) of the ground truth, in which the training loss may be written as:

$$\mathcal{L} = -\frac{1}{N}\sum_i \log p_i\left(n_i^{gt} \mid \theta_i(I, W)\right)$$

Where $p_i(n_i|I)$ is the surface normal probability distribution, i is the pixel index and I is the input image, $\theta_i$ is the set of parameters, which is estimated by a network of weights W, $n_i^{gt}$ is the NLL of the ground truth, and N is the number of pixels with ground truth.

In an embodiment, angular error may be minimized while attenuating the loss for pixels with high uncertainty, in which the angular error may be expressed as:

$$E\left[\cos^{-1}\mu_i^T n_i\right] = \frac{2k_i}{k_i + 1} + \frac{\exp(-k_i\pi)\pi}{1 + \exp(-k_i\pi)}$$

in which $\mu_i$ is the mean direction, $k_i$ is the concentration parameter, and $n_i$ and $\mu_i$ are unit vectors and $k_i \geq 1$, which may be used as a measure of the pixel-wise aleatoric uncertainty.

It is appreciated that while the above description has been described with respect to the surface normal, the same determination procedures may also be used for the other coordinate directions for three-dimensional processing, e.g., x-direction and y-direction, or any of the methods for principal direction determination as described herein.

In an embodiment, the prediction module 120 may be configured to determine the principal directions of the pixels in the image.

In an example embodiment, the prediction module 120 may be configured to estimate the three-dimensional directions of a pixel or each pixel in the image based on vanishing point estimation using perspective box(es) generated for planar surfaces of object(s) in the image. In an embodiment, a virtual intrinsic may be estimated for the perspective box of the object in the image, e.g., based on the contour line segments, and the pixel in the perspective box may be connected to the virtual intrinsic, e.g., to provide pixel perspective with respect to the vanishing point for the object. In an embodiment, the virtual intrinsic may be defined at the center of the object or image having coordinate $[c_x, c_y]$ with a 45-degree field of view as the focal length.

In an example embodiment, the prediction module 120 may be configured to determine the three-dimensional angle between the two contour line segments by normalization calculation based on the preset camera focal length parameters on the basis of the two-dimensional angle. That is, the corresponding three-dimensional direction can be added to the target frame through the preset camera focal length parameters. For example, the focal length parameter of the camera is f, the target vanishing point includes the target horizontal vanishing point and the target vertical vanishing point, the target horizontal vanishing point is represented as P1=(p1x, p1y), the target horizontal vanishing point is represented as P2=(p2x, p2y), the three-dimensional angle corresponding to P1 is P1_3d, and the three-dimensional angle corresponding to P2 is P2_3d, respectively, such that:

$$P1\_3d = (p1x, p1y, f)/|(p1x, p1y, f)|$$

$$P2\_3d = (p2x, p2y, f)/|(p2x, p2y, f)|$$

As such, the prediction module 120 may be configured to obtain corresponding three-dimensional directions of a pixel or each pixel using the two three-dimensional directions obtained above through orthogonal constraints to estimate the perspective direction of the pixel, e.g., determine the x and y principal directions, e.g., the horizontal and vertical directions, for the pixel in the image.

In another embodiment, the prediction module 120 may be configured to, for a pixel $p=(p_x, p_y)$ in the canonical camera coordinate system, represent the three-dimensional direction(s) of the pixel as $P=(p_x d, p_y d, d)$ where d is the depth value. In order to analyze the projections of two tangent principal directions, e.g., i and j, a line segment $l(P, \delta, i)$ that connects end-points P and $P+\delta \cdot i$ into the image as $l_p(P, \delta, i)$, which is the offset from p to the projection of $P+\delta i$:

$$l_p(P, \delta, i) = \frac{P + \delta i}{(P + \delta i)_z} - p = (i_x - p_x i_z, i_y - p_y i_z)\frac{\delta}{d + \delta i_z}$$

In an embodiment, given the prediction of $l_p^*(P, i) = (l_x^i, l_y^i)$ such that the direction may be computed as $i = (i_x, i_y, i_z)$ by solving:

$$i_x - p_x i_z = l_x^i$$

$$i_y - p_y i_z = l_y^i$$

$$i_x^2 + i_y^2 + i_z^2 = 1$$

The refinement module 130 may refer to one or more components or modules that are designed, programmed, or otherwise configured to refine the pixel principal directions of a pixel or each pixel in the image. In an example embodiment, the refinement module 130 may be configured to refine or modify the pixel coordinates of the pixel based on a global normalization. In an embodiment, the global normalization may be based on the gravity direction in the image which may be estimated from the y-directions of the pixels. In an embodiment, the refinement module 130 may be configured to segment the image into one or more horizontal regions and/or one or more vertical regions. For example, the pixels may be grouped in the one or more horizontal regions and/or the one or more vertical regions based on the vertical principal direction, e.g., y-direction, of the pixels. In an embodiment, if the inner product of the y-direction and the normal direction is large, e.g., larger than 35 degrees, the pixels may be considered to belong to the horizontal region. In an embodiment, if the inner product of the y-direction and the normal direction is really small, e.g., close to 90 degrees, e.g., ±5 degrees, the pixels may be considered to belong to the vertical region. As such, the pixels belonging to the horizontal region and the pixels belonging to the vertical regions may be segmented together, e.g., grouped together.

In an embodiment, if the image includes a predetermined amount of horizontal region(s), the refinement module 130 may be configured to estimate the gravity direction by taking the average of the y-directions of each of the pixels in the segmented regions for the horizontal region(s). In an example embodiment, the average of the y-directions may be a weighted average based on the uncertainty determination of each pixel, as discussed above. In an embodiment, the predetermined amount or percentage of horizontal regions may be greater than 20%, 30% or 40% of the image.

In an embodiment, when the image does not include the predetermined amount of horizontal region(s), the refinement module 130 may be configured to estimate the gravity direction based on the vertical region(s). For example, since the prediction module 120 has determined the y-direction for each pixel, the refinement module 130 may be configured to estimate the gravity direction by taking the weighted average of the y-directions of each of the pixels in the vertical region(s).

In an embodiment, based on the estimated gravity direction, the refinement module 130 may be configured to adopt such global information, e.g., gravity direction, and refine the principal directions of the pixel in the image, e.g., by taking the cross-product with the pixel coordinates. In an example embodiment, the refinement module 130 may be configured to refine the pixels in the vertical regions in the image by using the gravity direction as the vertical principal direction, e.g., y-direction, and using n×g as the horizontal principal direction, e.g., x-direction, for the pixel, where n is the normal direction of the pixel. The refinement model 130 may also be configured to refine the principal directions for the pixels, e.g., the pixel coordinates, in the horizontal regions in the image as a cross-product of the determined principal directions, x*, y*, e.g., as determined by the prediction module 110, according to the following equations:

$$x = y^* \times g,$$
$$y = x^* \times g.$$

That is, the refinement module 130 may be configured to estimate the gravity direction based on the segmentations of at least one of the horizontal regions or vertical regions to apply a global regularization to each of the pixels, which not only results in more regularized pixels, e.g., less jittering, the quality of the image is improved, especially, for images-in-the-wild, including outdoor images and nature images.

The rendering module 140 may refer to one or more components or modules that are designed, programmed, or otherwise configured to insert a virtual object in the image. In an embodiment, based on the refined pixel coordinates, e.g., pixel directions, the rendering module 140 may be configured to insert the virtual object having good visual quality that is regularized to follow the perspective of the object, e.g., on the planar surface, in the image. For example, advertisements, virtual props, dynamic images, people, etc. may be dynamically inserted anywhere in the image at different object locations, and based on the principal directions of the pixels of the object, the virtual object will have the same or similar perspective for improved image quality and virtual object placement.

As such, while the current state-of-art models for per-pixel coordinate estimation, such as FrameNet, are not able to estimate principal directions for outdoor images, the pixel refinement model as described and discussed herein is configured to process both indoor and outdoor images. In the embodiments, as discussed herein, at least because the pixel refinement model adopts a global normalization and may be trained from images-in the-wild with ground truth or pseudo ground truth labelling, the pixel refinement model is able to provide imaging results that have much better visual quality and estimations for virtual object insertion which have the correct pixel perspectives, for example, for virtual ad placement or animation in a static image, video, or augmented reality application without the jittering effects as in Frame-Net.

Figure 2:
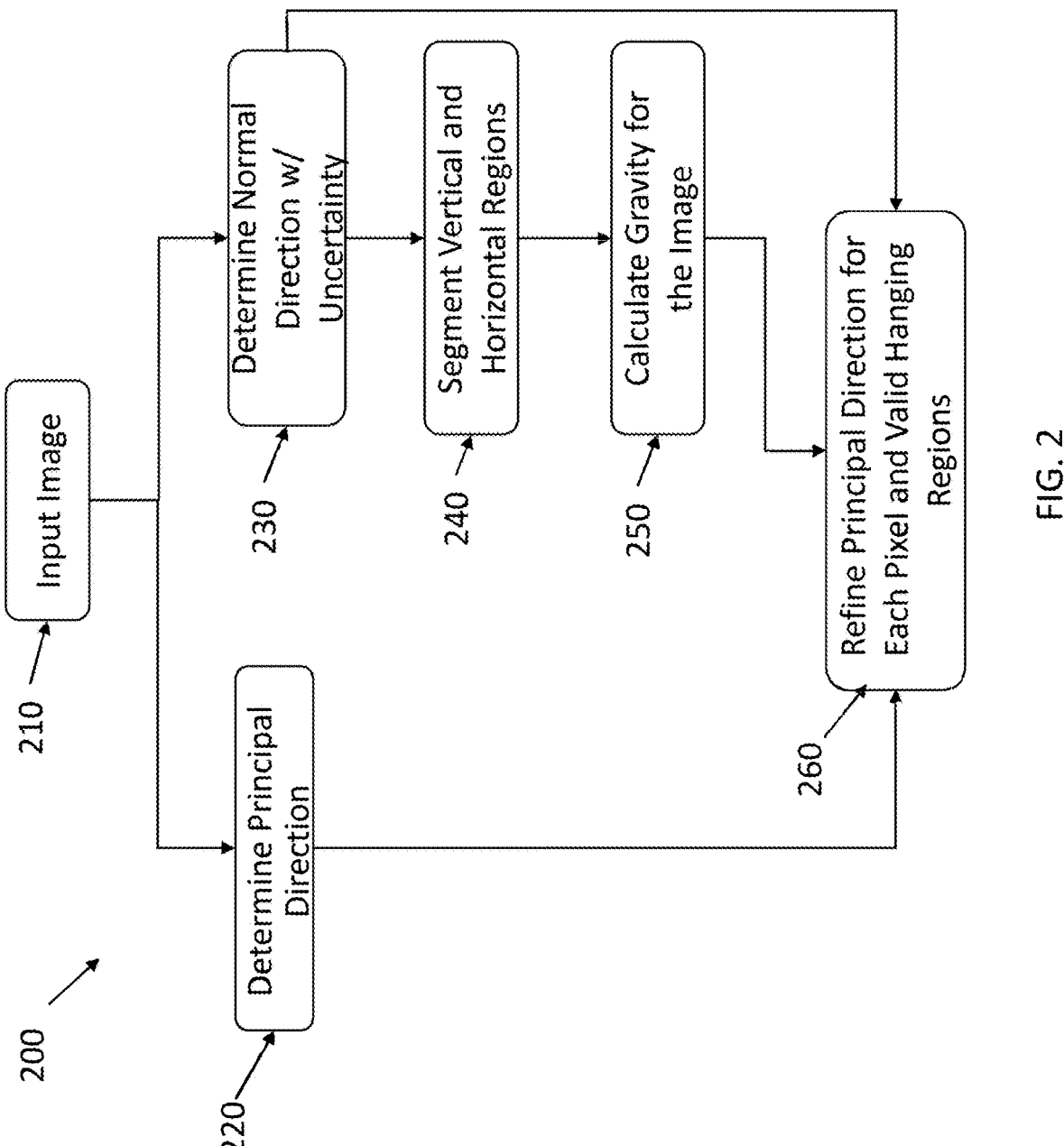
FIG. 2 shows an example processing flow for implementation of pixel refinement of pixels, in accordance with at least some embodiments described and recited herein.

FIG. 2 shows an example processing flow for implementation of the pixel refinement model 100, in accordance with at least the embodiments of FIG. 1, as described and recited herein. As depicted, processing flow 200 includes operations or sub-processes executed by various components of pixel refinement model 100 including the prediction module 120 and the refinement module 130, as shown and described in connection with FIG. 1. However, processing flow 200 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description.

Processing flow 200 may include various operations, functions, or actions as illustrated by one or more of blocks 210, 220, 230, 240, 250, and 260. These various operations, functions, or actions may, for example, correspond to software, program code, or program instructions executable by a processor that causes the functions to be performed. Processing may begin at block 210.

At block 210 (input image), an image may be received or otherwise input to a pre-trained pixel refinement model (e.g., 100). The pixel refinement model (e.g., 100) may be implemented, designed, stored, executed, performed, or otherwise hosted in an electronic device (e.g., 600 of FIG. 6). At block 210, features may be extracted, such as, objects, surfaces, or the like from the image using an encoder and/or MLPs. In an embodiment, a plurality of feature maps may be generated from the image. The plurality of feature maps may be generated with different resolutions, e.g., low resolution, e.g., ⅛ resolution, ¼ resolution, ½ resolution, or the like. In an embodiment, scene information from the plurality of feature maps may be processed using a bin-width estimate block, in which the bin width changes based on the predicted depth range of the image. As such, at block 210, a single channel h×w depth image, e.g., at half the spatial resolution, may be outputted. Processing may proceed to blocks 220 and 230.

At block 220 (determine principal direction), the principal directions, e.g., x-direction and y-direction, which may represent a pair of orthogonal directions in a three-dimensional space, of each pixel in the image may be determined. The principal directions may follow the principal curvatures of surfaces of the objects in the image, e.g., computing tangent principal directions. In an embodiment, a four-way rotationally symmetric orientation field may be used, such that there may be four valid choices for the tangent principal directions at each vertex, as such any pair of orthogonal tangent vectors in the cross field may be chosen to represent the principal directions, and the three alternatives may be used for valid ground truth.

In an embodiment, at block 220, the principal directions may be estimated by using a vanishing point estimate for perspective box(es) of object(s) in the image. In an embodiment, contour line segments may be used to determine perspective box(es) for objects in the image and estimating a virtual intrinsic for the perspective box. Each pixel in the perspective box may be connected to the virtual intrinsic, e.g., to form the vanishing point for the object. The three-dimensional angle between the two contour line segments may be determined by normalization calculation based on the preset camera focal length parameters on the basis of the two-dimensional angle. That is, the corresponding three-dimensional direction can be added to the target frame through the preset camera focal length parameters. For example, the focal length parameter of the camera is f, the target vanishing point includes the target horizontal vanishing point and the target vertical vanishing point, the target horizontal vanishing point is represented as P1=(p1x, p1y), the target horizontal vanishing point is represented as P2=(p2x, p2y), the three-dimensional angle corresponding to P1 is P1_3d, and the three-dimensional angle corresponding to P2 is P2_3d, respectively, such that:

$$P1\_3d = (p1x, p1y, f)/|(p1x, p1y, f)|$$

$$P2\_3d = (p2x, p2y, f)/|(p2x, p2y, f)|$$

As such, corresponding three-dimensional directions of each pixel may be obtained using the two three-dimensional directions obtained above through orthogonal constraints to estimate the perspective directions of each pixel, e.g., determine the x and y principal directions, e.g., the horizontal and vertical directions for each pixel in the image.

In another embodiment, the principal directions may be estimated by having a pixel p=($p_x$, $p_y$) in the canonical camera coordinate system, represent a three-dimensional position of the pixel as P=($p_x$d, $p_y$d, d) where d is the depth value. In order to analyze the projections of two tangent principal directions, e.g., i and j, a line segment l(P, δ, i) that connects end-points P and P+δ·i into the image as $l_p$(P, δ, i), which is the offset from p to the projection of P+δi:

$$l_p(P, \delta, i) = \frac{P + \delta i}{(P + \delta i)_z} - p = (i_x - p_x i_z, i_y - p_y i_z)\frac{\delta}{d + \delta i_z}$$

In an embodiment, given the prediction of $l_p$*(P, i)=($l^i_x$, $l^i_y$) such that the direction may be computed as i=($i_x$, $i_y$, $i_z$) by solving:

$$i_x - p_x i_z = l^i_x$$

-continued $$i_y - p_y i_z = l^i_y$$

$$i_x^2 + i_y^2 + i_z^2 = 1$$

While specific embodiments to determine the principal directions have been discussed herein, it is appreciated that other methods or models may be used to determine the principal directions. As such, the coordinates for the pixels in the canonical camera coordinate system and respective principal directions may be determined.

At block 230 (determine normal direction with uncertainty), convolutional layer(s) may be used that receives the feature map(s) and configured to make coarse predictions and/or refined predictions of e.g., normal directions, uncertainty, principal directions, e.g., x-direction and y-direction. In an embodiment, the coarse prediction(s) may be made from a ⅛ resolution feature-map using a 3×3 convolution layer, in which training loss is applied to all pixels. The coarse prediction may be passed through pixel-wise refinement modules that are configured to make predictions of size (H/2n×W/2n), and the output is a refined prediction of size (H/n×W/n). In an embodiment, the prediction and feature map may be bilinearly upsampled by a factor of 2; and during training, a subset of pixels based on the uncertainty may be selected, and a refined output of the sampled pixels estimated using a MLP with three hidden layers, each with 128 nodes and a non-linear activation function, e.g., rectified linear unit (ReLU) activation. The input to the MLP may be a concatenated vector of the pixel-wise feature and prediction. In an embodiment, during training, the loss may be calculated only for the sampled pixels, but at test time or inference, the trained MLPs are applied to all pixels.

In another embodiment, the normal direction may be determined using a surface normal estimation using a UNet architecture, e.g., a fully convolutional neural network, (6 down/6 Up) with angular and L1 losses, light 2D data augmentation, and input resolutions, which may be between 256 and 512. Adam, an algorithm for first-order gradient-based optimization of stochastic objection functions, based on adaptive estimates of lower-order moments (see, https://arxiv.org/abs/1412.6980 (accessed Feb. 22, 2023)) with LR 10⁻⁴ and weight decay 2×10⁻⁶ may also be used.

In an embodiment, training of the system may be based on training data that includes images-in-the-wild, as discussed further below, in which the ground truth normal (and/or principal direction) may be compared with the predicted normal (and/or principal directions) with the associated predicted uncertainty to minimize training loss and/or the error for all the perspective directions for each pixel in the image. In an embodiment, the uncertainty may be predicted based on the per-pixel surface normal probability distribution, e.g., using the von Mises-Fisher distribution or adaption/modification thereof, may be determined by minimizing the negative log-likelihood (NLL) of the ground truth, in which the training loss may be written as:

$$\mathcal{L} = -\frac{1}{N}\sum_i \log p_i(n_i^{gr} \mid \theta_i(I, W))$$

Where $p_i(n_i|I)$ is the surface normal probability distribution, i is the pixel index and I is the input image, $\theta_i$ is the set of parameters, which is estimated by a network of weights W, $n_i^{gr}$ is the NLL of the ground truth, and N is the number of pixels with ground truth.

In an embodiment, angular error may be minimized while attenuating the loss for pixels with high uncertainty, in which the angular error or uncertainty may be expressed as:

$$E\left[\cos^{-1}\mu_i^T n_i\right] = \frac{2k_i}{k_i+1} + \frac{\exp(-k_i\pi)\pi}{1+\exp(-k_i\pi)}$$

in which $\mu_i$ is the mean direction, $k_i$ is the concentration parameter, and $n_i$ and $\mu_i$ are unit vectors and $k_i \geq 1$, which may be used as a measure of the pixel-wise aleatoric uncertainty. Processing may proceed to block 240.

At block 240 (segment vertical and horizontal regions), the image may be segmented into one or more horizontal regions and/or one or more vertical regions. For example, the pixels may be grouped in the one or more horizontal regions and/or the one or more vertical regions based on the vertical principal direction, e.g., y-direction, of the pixels. In an embodiment, if the inner product of the y-direction and the normal direction is large, e.g., greater than 35 degrees, the pixels may be considered to belong to the horizontal region. In an embodiment, if the inner product of the y-direction and the normal direction is really small, e.g., close to 90 degrees, the pixels may be considered to belong to the vertical region. As such, the pixels belonging to the horizontal region and the pixels belonging to the vertical regions may be segmented together, e.g., grouped together. Processing may proceed to block 250.

At block 250 (calculate gravity for the image), the gravity direction may be estimated or determined by taking the average of the y-directions of each of the pixels in the segmented regions for the horizontal region(s). In an example embodiment, the average of the y-directions may be a weighted average based on the uncertainty determination of each pixel, as discussed above. In an embodiment, the predetermined amount or percentage of horizontal regions may be greater than 20%, 30% or 40% of the image.

In an embodiment, when the image does not include the predetermined amount of horizontal region(s), the gravity direction may be estimated or determined based on the vertical region(s). For example, since the y-direction has already been estimated or determined for each pixel, e.g., at block 220 and/or block 230, the gravity direction may be estimated or determined by taking the weighted average of the y-directions of each of the pixels in the vertical region(s). Processing may proceed to block 260.

At block 260 (refine-principal direction for each pixel and valid hanging regions), such global information, e.g., gravity direction, may be adopted and the principal directions of each pixel in the image, e.g., the pixel coordinates, may be refined. In an example embodiment, the pixels in the vertical regions in the image may be refined by using the gravity direction as the vertical principal direction, e.g., replacing the y-direction coordinate, and using n×g as the horizontal principal direction, e.g., replacing the x-direction coordinate, for each pixel, where n is the normal direction of the pixel. The principal directions for the pixels, e.g., the pixel coordinates, in the horizontal regions in the image may also be refined by taking the cross-product of the estimated principal directions, x*, y*, e.g., as determined at block 220, according to the following equations:

$$x = y^* \times g,$$

$$y = x^* \times g.$$

In an embodiment, in the horizontal regions where the pixel is totally horizontal, e.g., the gravity direction is close to or the same as the normal direction, since the gravity cannot be used to replace the vertical direction of the pixel, the cross-product is used to ensure that the two directions are perpendicular to the gravity direction.

After each of the pixels in the image has been refined, not only are the pixels more regularized, the quality of the image is improved, especially, for images-in-the-wild, including outdoor images and nature images, such that a virtual object may be dynamically inserted anywhere in the image or video (e.g., each frame in the video) at different object locations, and based on the principal directions of the pixels of the object, the vertical object will have the same or similar perspective for improved image quality and virtual object placement.

It is appreciated that in an embodiment, after each of the pixels in an image have been refined, the image having the refined pixels may be used during the training of subsequent pixel refinement models for further improved estimations of the principal directions and normal direction with uncertainty.

Figure 3:
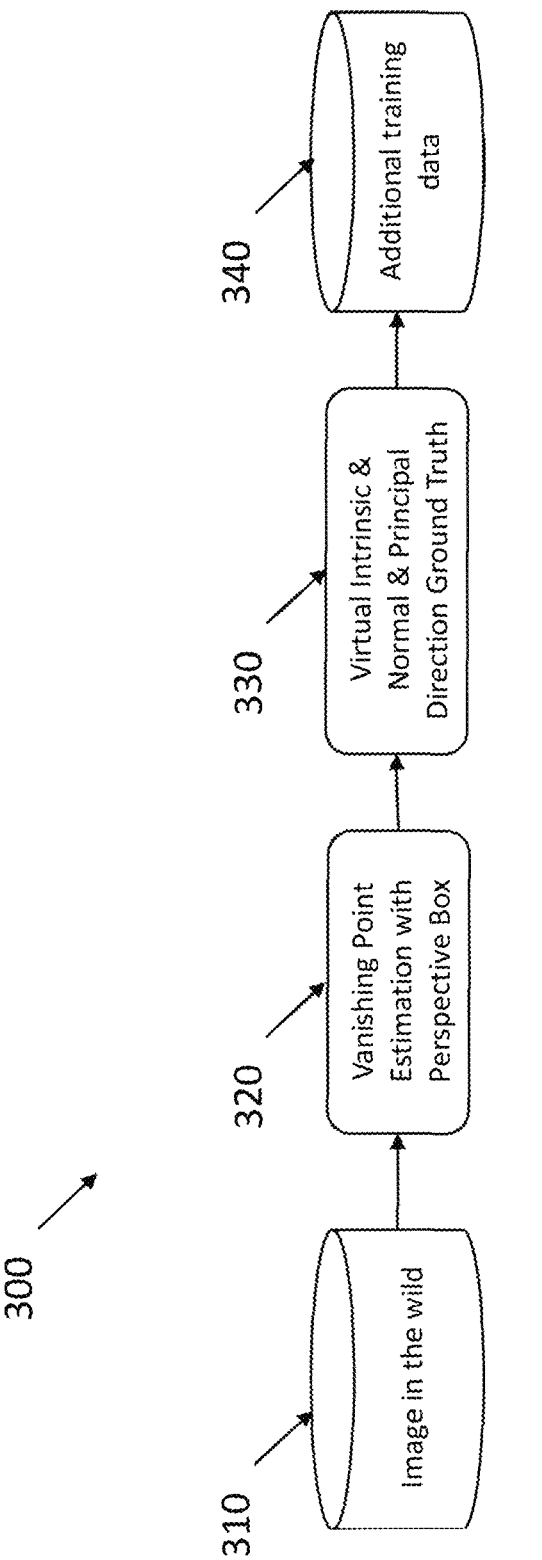
FIG. 3 shows an example processing flow for determining perspective directions for a pixel in an image, arranged in accordance with at least some embodiments described and recited herein.

FIG. 3 is an example processing flow for determining ground truth information for images-in-the-wild, as described and recited herein. While there are indoor datasets provided in a controlled space having a fixed environment, on which it is easy to collect data, such as in FrameNet, such that object classification, feature maps, three-dimensional meshes, etc. are identified for supervised or semi-supervised training of a CNN, such datasets may provide strong correlation/bias to the large planar surfaces, such as walls and floors. The processing flow as discussed herein, however, is provided to determine ground truth information of both indoor and outdoor images, and especially, for images-in-the-wild overcoming such disadvantages of use of indoor datasets with fixed information. As such, by using images-in-the-wild having ground truth information (or pseudo-ground truth, since the ground truth is not determined in a controlled setting) to train any of the models, as discussed herein, e.g., the pixel refinement model in connection with FIG. 1, the trained model is more robust and able to provide more accurate predictions or estimations of perspectives of each pixel in the image, e.g., principal directions and/or normal direction with uncertainty, to be able to project a virtual object anywhere in the image with the proper pixel direction perspective. As depicted, processing flow 300 includes operations or sub-processes executed by various components, and may be a function, an operation, an action, an algorithm, an application, or the like that is implemented, designed, stored, executed, performed, or otherwise hosted in an electronic device (e.g., 600 of FIG. 6, etc.) such as a graphics processing unit ("GPU"), central processing unit ("CPU"), or other processor-enabled device, which may be a cloud-based network, a local device, or downloaded to the local device, a server, a smartphone, a tablet computer, a laptop computer, a desk computer, and/or any other suitable electronic device. However, processing flow 300 is not limited to such components and processes, as obvious modifications may be made by re-ordering two or more of the sub-processes described here, eliminating at least one of the sub-processes, adding further sub-processes, substituting components, or even having various components assuming sub-processing roles accorded to other components in the following description.

Processing flow 300 may include various operations, functions, or actions as illustrated by one or more of blocks 310, 320, 330, and 340. These various operations, functions, or actions may, for example, correspond to software, program code, or program instructions executable by a processor that causes the functions to be performed. Processing may begin at block 310.

At block 310 (image-in-the-wild), images may be received or otherwise input to a ground truth determination model. The ground truth determination model may be implemented, designed, stored, executed, performed, or otherwise hosted in an electronic device (e.g., 600 of FIG. 6). The images may be images-in-the-wild such as, for example, images of indoor, outdoor, and/or nature settings, which may be captured or produced from uncontrolled sources, e.g., user captured photos from user electronic device (e.g., 600 of FIG. 6) that may or may not include identification of features in the photo, such as, feature maps, three-dimensional meshes, classifications, or the like. At block 310, features may be extracted, such as, objects, surfaces, or the like from the image, using a MLP. In an embodiment, a plurality of feature maps may be generated from the image. The plurality of feature maps may be generated with different resolutions. Processing may proceed to block 320.

At block 320, the ground truth determination model may be configured to use a vanishing point estimation to express the shooting angle, e.g., camera angle, in the image. The vanishing point estimation may include extracting the structural features of objects in the image, as discussed and described herein, by identifying edge corners in the objects and generating the structural frame representing the outline of the object plane and forming perspective boxes, as disclosed in Chinese application CN202210761378.8, which is to be filed as international application, PCT/CN2022/0XXXX, which is incorporated herein by reference. The vanishing point estimation may be performed automatically on the image or performed by user selection.

Figure 4:
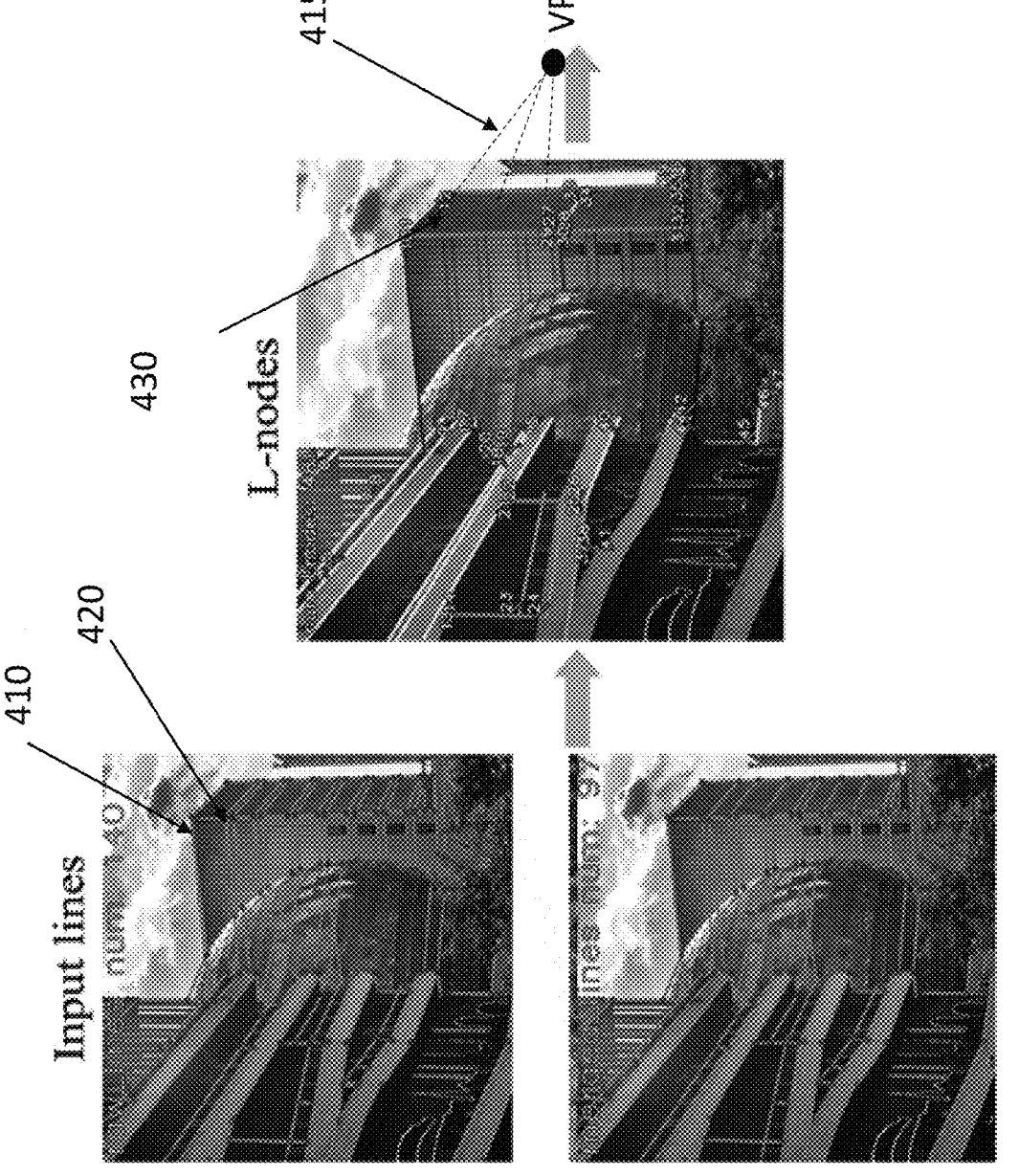
FIG. 4 illustrates an example process for implementing the processing flow of FIG. 3.

As seen in FIG. 4, in an embodiment, the ground truth determination model may be configured to obtain the contour line segments 410 and edge corners 420 in the image, and based on the contour line segments and corresponding edge corners, to process a plurality of vanishing points VP in the image. The selected vanishing points may include horizontal vanishing points and vertical vanishing points, which may be obtained by detecting two contour line segments corresponding to each edge corner. If the obtained horizontal vanishing points and/or vertical vanishing points are true (that is, the number of related line segments of vanishing points is greater than the number threshold), the generated horizontal vanishing points and/or vertical vanishing points will pass through the edge corner to estimate the vanishing point(s) for the respective formation of the perspective box(es).

In an example embodiment, the vanishing point estimation to express the shooting angle may include:

1) Acquiring contour line segments 410, and obtaining corresponding edge corners 420 based on the contour line segments 410, in which the contour line segments 410 represent the contour of the object(s) in the image to be detected, and the edge corners 420 are intersections between the contour line segments 410. In an embodiment, the contour line segments 410 may all be straight line segments that represent the contours of objects in the image to be processed after the target object is detected. A plurality of contour line segments 410 may be present in the image, and the extension directions 415 of each contour line segment 410 may be the same or different according to the specific object structure. Among them, some contour line segments 410 may intersect, and the corner where the contour line segments intersect may be the edge corner 420.

According to the positional relationship among the contour line segments 410, the intersection points between the contour line segments may be determined, e.g., the edge corners 420 are determined by the intersectional relationship of the contour line segments 410 representing the contour of the object, so that the structural characteristics of the object can be displayed. Among them, the process of detecting the image to be processed to obtain the contour line segment may be obtained by recognizing the line segment of the image to be processed by a pre-trained neural network model.

In some embodiments, the endpoints of two contour line segments 410 may intersect and coincide with one point (i.e., two contour line segments forming an "L" shape). In this case, the edge corner 420 is the coincident point of the endpoints of two contour line segments 410. In other embodiments, the endpoint of one contour line segment 410 intersects with the middle of another contour line segment 410 (that is, two contour line segments forming a "T" shape). In this case, the endpoint intersecting with the middle of the contour line segment is the edge corner 420.

After the edge corners 420 are obtained, for some contour line segments 410 that are close to each other, the distances between the corresponding edge corners 420 may also be very close. When the structural frame representing the outline of the object plane is generated based on the edge corners, if the area of the structural frame is too small it may be possible to fuse the edge corners to reduce the number of edge corners, reduce the invalid detection process and improve the overall detection speed. For example, the step of obtaining the corresponding edge corner points 420 based on the contour line segment 410 may include:

A) According to the intersection relationship of each contour line segment 410, at least two intersection corners are obtained.

B) Based on the density clustering algorithm, the intersection nodes are clustered and fused to generate edge corners 420.

In an example embodiment, the intersection relationship of each contour line segment 410 may be realized by an intersection detection algorithm between line segments. Then, the obtained intersection corners may be merged based on the density clustering algorithm, so that the similar intersection corners are merged into the same corner, that is, the edge corner 420. Among them, density clustering is also called density-based clustering. This kind of algorithm assumes that the clustering structure can be determined by the tightness of sample distribution. Usually, the density clustering algorithm examines the connectedness of samples from the perspective of sample density, and continuously expands the cluster based on the connectible samples to obtain the final clustering result. Through the density clustering algorithm, the intersecting nodes may be clustered and fused, and only the edge corners where the endpoints 420 of two contour line segments 410 intersect and coincide with one point are reserved (that is, the edge corners corresponding to the two L-shaped contour line segments).

2) At least two quadrilateral structural frames 430 may be generated through edge corners 420, and the structural frames 430 represent the outline of a plane of the object(s) in the image to be detected. For example, after the edge corners 420 are obtained, since the edge corners 420 are generated based on two intersecting contour line segments 410, each edge corner 420 corresponds to two contour line segments 410. Based on the positional relationship between the contour line segments 410 corresponding to one or more edge corners 420, a closed quadrilateral, that is, a structural frame 430, may be constructed. Because the edge corners 420 may represent the structural features of the object, the quadrilateral structural frame based on the edge corners may represent the outline of a plane of the object in the image to be detected. Specifically, in an embodiment, by sequentially traversing each edge corner, the L-shaped structure formed by two contour line segments 410 corresponding to the edge corner 420 and the L-shaped structure formed by two contour line segments 410 corresponding to other edge corners 420 may be combined, and at least two edge corners which may form a closed quadrilateral may be detected, thereby generating a structural frame 430.

In an example embodiment, the specific implementation may include:

A) The corner structure corresponding to each edge corner 420 is obtained, and the corner structure includes two contour line segments 410 forming edge corners 420.

B) According to the positional relationship between the corner structures corresponding to each edge corner 420, at least one group of corner structure combinations may be obtained, which includes at least one corner structure, and the corner structures in the corner structure combinations belong to the same quadrilateral; when the corner structure combinations include more than two corner structures, at least one contour line segment of any corner structure in the corner structure combinations partially overlaps with another corner structure.

C) According to the corner structure combination, a structural frame may be generated for each object with an associated vanishing point VP.

Processing may proceed to block 330.

At block 330, the ground truth determination model may be configured to determine the normal direction and/or principal direction ground truths for each of the pixels in the input data to provide ground truth labelling for the objects in the image. In an example embodiment, the ground truth determination model may be configured to estimate the three-dimensional directions of each pixel in the objects in the image based on the vanishing point estimation with the perspective box(es). In an embodiment, a virtual intrinsic may be estimated for the perspective box of each of the objects in the input data, e.g., based on the contour line segments, and each pixel in the perspective box may be connected to the virtual intrinsic. In an embodiment, the virtual intrinsic may be defined at the center of the object or image having coordinate $[c_x, c_y]$ with a 45-degree field of view as the focal length.

In an example embodiment, the ground truth determination model may be configured to determine the three-dimensional angle between the two contour line segments by normalization calculation based on the preset camera focal length parameters on the basis of the two-dimensional angle. That is, the corresponding three-dimensional direction can be added to the target frame through the preset camera focal length parameters. For example, the focal length parameter of the camera is f, the target vanishing point includes the target horizontal vanishing point and the target vertical vanishing point, the target horizontal vanishing point is represented as P1=(p1x, p1y), the target horizontal vanishing point is represented as P2=(p2x, p2y), the three-dimensional angle corresponding to P1 is P1_3d, and the three-dimensional angle corresponding to P2 is P2_3d, respectively, such that:

$$P1\_3d = (p1x, p1y, f)/|(p1x, p1y, f)|$$
$$P2\_3d = (p2x, p2y, f)/|(p2x, p2y, f)|$$

As such, the ground truth determination model may be configured to obtain corresponding three-dimensional directions of each pixel using the two three-dimensional directions obtained above through orthogonal constraints to estimate the perspective directions of each pixel, e.g., determine the normal directions and principal directions, e.g., x and y principal directions, for the horizontal and vertical directions for each pixel in the image as ground truths or pseudo-ground truths, which may be used for ground truth labelling of the objects in the image from the image-in-the-wild.

In another embodiment, the vanishing points may be used, in which two lines are used to get a first vanishing point $v_1$, then samples are uniformly taken of a second vanishing point $v_2$ on the great circle of $v_1$ on the equivalent sphere, and finally, the third vanishing point $v_3$ may be calculated by the cross-product of $v_1$ and $v_2$, for example, as described by Lu et al. in "2-Line Exhaustive Searching for Real-Time Vanishing Point Estimation in Manhattan World," (https://xiaohulugo.github.io/papers/Vanishing_Point_Detection_WACV2017.pdf, accessed Feb. 23, 2023), which is incorporated by reference. In an embodiment, the $v_1$ and $v_2$ may be horizontal or vertical vanishing points. In an embodiment, a polar grid may be used that is built by extending the unit vectors on the equivalent sphere to intersect with the image plane. The equivalent sphere may be a unit sphere which centers in the focal point of the camera, in which a right-hand coordinate system with the X-axis and the Y-axis is applied coinciding with the x-axis and y-axis of the image, respectively, and the Z-axis directs from the focal point of the camera to the principal point of the image. Given the principal point $(x_0, y_0)^T$ and the focal length f of the image, a pixel $(x, y)^T$ on the image can be converted into the equivalent sphere coordinate system via the following formulations:

$$X = x - x_0,$$
$$Y = y - y_0,$$
$$Z = f.$$

For a 3D point P in the equivalent sphere coordinate whose coordinates are $(X, Y, Z)^T$, the latitude and longitude $(\phi, \lambda)$ of P is calculated as:

$$\phi = a\cos\left(Z / \sqrt{X^2 + Y^2 + Z^2}\right),$$
$$\lambda = a\tan2(X, Y) + \pi.$$

Given a point p on the image plane, the latitude and longitude $(\phi, \lambda)$ on the equivalent sphere may be obtained. Thus, the polar grid $C_1$ may be built by the following steps.

The polar grid $C_1$ may be zero-initialized with a size of 90×360 with an accuracy of 1 degree, e.g., $C_1(i, j)=0$ for i=1, 2, ..., 90 and j=1, 2, ..., 360. Then, for every pair of line segments $l_1$ and $l_2$ on the image, their intersecting point p may be calculated and then the latitude and longitude $(\phi, \lambda)$ of p can be obtained. Then, the corresponding grid cell $C_1(\phi_{deg}, \lambda_{deg})$ may be updated.

In an embodiment, a 2-line minimal solution set (MSS) may be used to generate the hypotheses for only the first vanishing point and then the second vanishing point is exhaustively sampled and the third vanishing point is generated via the first and second vanishing points. For example, first, two line segments may be randomly selected for intersection to generate the first vanishing point $v_1$. Then the second vanishing point $v_2$ may be uniformly sampled on the great circle of $v_1$ in the equivalent sphere. Finally, the third vanishing point $v_3$ may be calculated by the cross product of $v_1$ and $v_2$. It is appreciated that $v_3$ may be the normal direction, while $v_1$ and $v_2$ are the x and y directions. Processing may proceed to block 340.

At 340, the images, including the images-in-the-wild, having the ground truth labelling, e.g., normal direction and perspective directions ground truths, may be provided to train any of the models, as discussed and described herein. As such, instead of only using indoor images to train the models that have a fixed environment, on which it is easy to collect data, such as in FrameNet, such additional training data, as described herein, may be provided to the models such that a more robust model may be provided that is able to refine pixels in all types of images, e.g., indoor, outdoor, and/or nature image, and especially for images-in-the-wild.

It is appreciated that at 320, while the vanishing point estimation with perspective box has been discussed herein, it is appreciated that other methods may be used to determine the perspective box(es) for the objects in the images. In some embodiments, the perspective box(es) may be labeled by user labelling. In the user labelling process, users may identify and label perspective box(es) in the image-in-the-wild. The perspective box(es) may be any geometric shape to identify the plane of the object, such as, quadrilateral, rectangle, semi-spheroid, trapezoid, or the like. In some embodiments, the user labelling may also include determining the ground truth labeling for the normal and principal directions.

Figure 5:
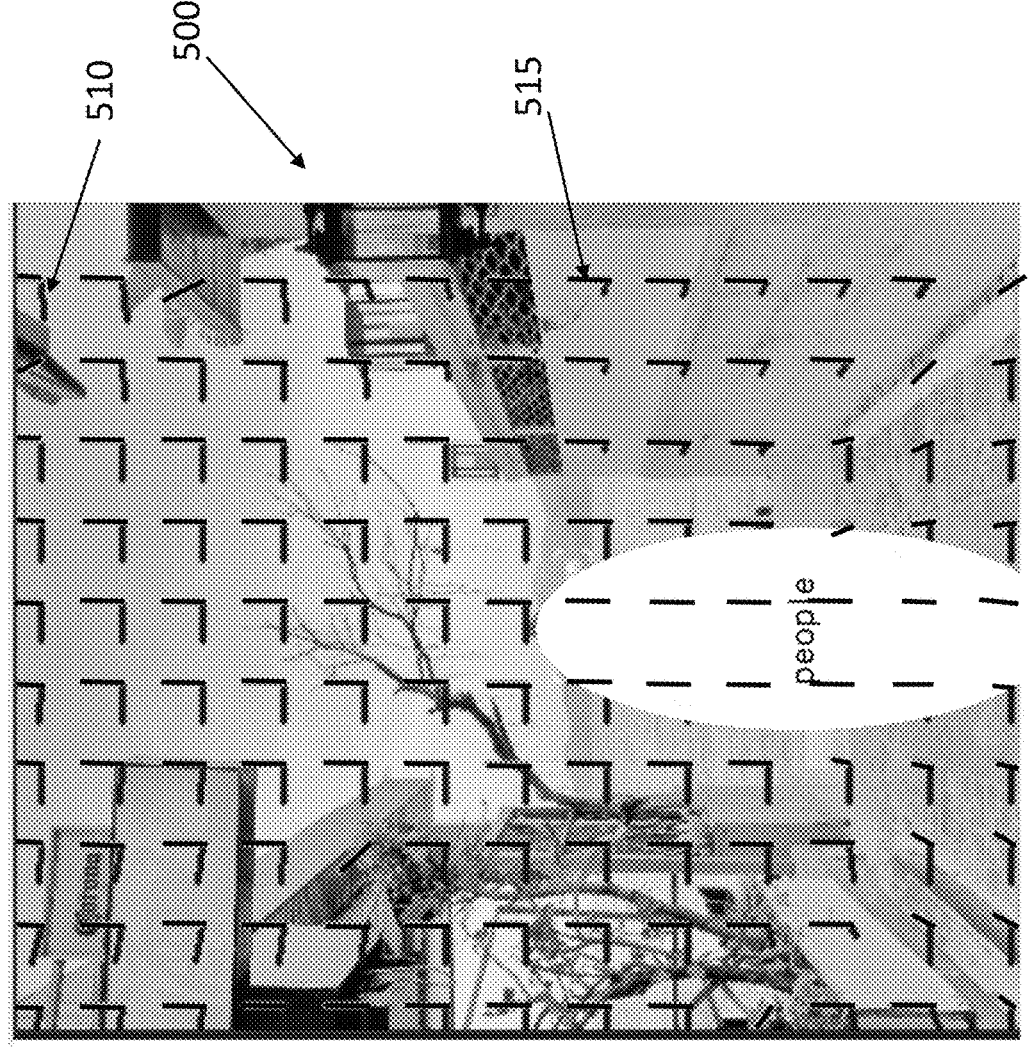
FIG. 5 illustrates an example representation of input data modified to have the refined pixels resulting from the pixel refinement model, arranged in accordance with at least some embodiments described herein.

FIG. 5 illustrates an example 500 that includes an output of the pixel refinement model and process flow thereof (e.g., 100 of FIG. 1 or 200 of FIG. 2), arranged in accordance with at least some embodiments described herein.

FIG. 5 illustrates that the pixel refinement model described herein may provide refinement to each pixel in the image, including images of outdoor or nature settings. As represented by the horizontal and vertical perspectives lines or coordinates (510, 515), the pixel refinement model (e.g., 100 of FIG. 1 or 200 of FIG. 2) has been configured to apply the global normalization to each pixel by taking a cross product of the gravity direction with the pixel directions in the vertical regions and horizontal regions, as discussed above. As such, the pixel refinement model may have been trained to refine each pixel using the global normalization such that the image has better visual quality and pixel perspective direction determination for improved virtual object placement anywhere in the image such that the inserted virtual object would have the correct pixel perspective.

Figure 6:
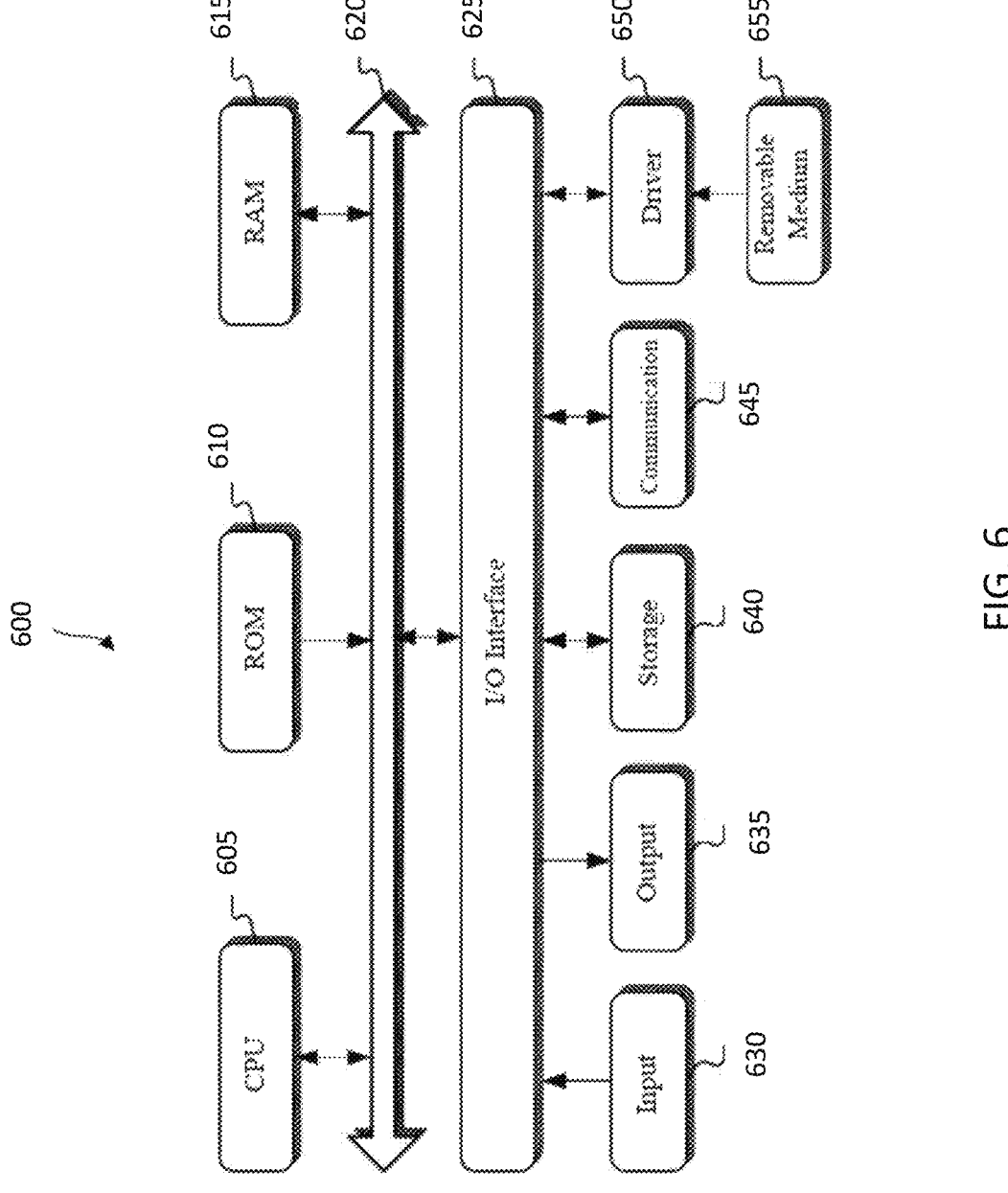
FIG. 6 shows an illustrative computing embodiment, in which any of the processes and sub-processes for automatic data generation may be implemented as executable instructions stored on a non-volatile computer-readable medium.

FIG. 6 is a schematic structural diagram of an example computer system 600 applicable to implementing an electronic device (for example, a GPU or CPU), arranged in accordance with at least some embodiments described herein. It is to be understood that the computer system shown in FIG. 6 is provided for illustration only instead of limiting the functions and applications of the embodiments described herein.

As depicted, the computer system 600 may include a central processing unit (CPU) 605. The CPU 605 may perform various operations and processing based on programs stored in a read-only memory (ROM) 610 or programs loaded from a storage device 640 to a random-access memory (RAM) 615. The RAM 615 may also store various data and programs required for operations of the system 600. The CPU 605, the ROM 610, and the RAM 615 may be connected to each other via a bus 620. An input/output (I/O) interface 625 may also be connected to the bus 620.

The components connected to the I/O interface 625 may further include an input device 630 including a keyboard, a mouse, a digital pen, a drawing pad, or the like: an output device 635 including a display such as a liquid crystal display (LCD), a speaker, or the like: a storage device 640 including a hard disk or the like; and a communication device 645 including a network interface card such as a LAN card, a modem, or the like. The communication device 645 may perform communication processing via a network such as the Internet, a WAN, a LAN, a LIN, a cloud, etc. In an embodiment, a driver 650 may also be connected to the I/O interface 625. A removable medium 655 such as a magnetic disk, an optical disk, a magneto-optical disk, a semiconductor memory, or the like may be mounted on the driver 650 as desired, such that a computer program read from the removable medium 655 may be installed in the storage device 640.

It is to be understood that the disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., a field programmable gate array, an application specific integrated circuit, or the like.

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., erasable programmable read-only memory, electrically erasable programmable read-only memory, and flash memory devices: magnetic disks, e.g., internal hard disks or removable disks; magneto optical disks; and compact disc read-only memory and digital video disc read-only memory disks. The processor and the memory can be supplemented by, or incorporated in, special purpose logic circuitry.

It is to be understood that different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by both this disclosure. It is indeed intended that the scope of this disclosure should be determined by a proper legal interpretation and construction of the disclosure, including equivalents, as understood by those of skill in the art relying upon the complete disclosure present at the time of filing.

Aspects:

It is appreciated that any one of aspects can be combined with each other.

Aspect 1. A method for refining pixels in an image, the method comprising: determining principal directions of a pixel in the image: determining a normal direction of the pixel in the image; segmenting regions in the image as one or more horizontal regions and one or more vertical regions based on the normal direction of each pixel in the segmented regions: obtaining global normalization information for the image from the segmented regions; and refining the principal directions of the pixel in the image based on the global normalization information.

Aspect 2. The method of Aspect 1, wherein determining the principal directions of the pixel includes: generating two-dimensional geometric shapes for objects having the pixel in the image based on contour line segments: providing a virtual intrinsic for each of the objects in the image; and determining the principal directions for the pixels in the objects in the image based on the virtual intrinsic and the contour line segments.

Aspect 3. The method of Aspect 2, wherein the two-dimensional geometric shapes are quadrilateral.

Aspect 4. The method of Aspect 2, wherein the virtual intrinsic is at a center of the objects and at a focal length at about 45-degree field of view.

Aspect 5. The method of any of Aspects 1-4, wherein the principal directions include an x-direction and a y-direction representing a pair of orthogonal directions in a three-dimensional space, and wherein the obtaining of the global normalization information includes, and wherein the obtaining of the global normalization information includes: estimating a gravity direction for the image by averaging the y-directions of each pixel in the one or more horizontal regions in the image.

Aspect 6. The method of Aspect 5, wherein refining the principal directions of the pixel includes: for the pixel in the one or more vertical regions, replacing the y-direction with the estimated gravity direction for the pixel and replacing the x-direction by taking a cross product of the gravity direction with the normal direction of the pixel.

Aspect 7. The method of Aspect 5, wherein refining the principal directions of the pixel includes: for the pixel in the horizontal regions, replacing the x-direction by taking a cross product of the gravity direction with the determined y-direction and replacing the y-direction by taking the cross product of the gravity direction with the determined x-direction.

Aspect 8. The method of any of Aspects 1-7, wherein when the one or more horizontal regions in the image comprises less than a predetermined percentage of a total of the one or more horizontal regions and the vertical regions, the obtaining of the global normalization includes: estimating a gravity direction for the image by taking an average of y-directions from the pixel in the one or more vertical regions.

Aspect 9. The method of any of Aspects 1-8, wherein the determining of the principal directions includes: identifying contour line segments in the image: extracting structural features of objects in the image by identifying edge corners of the objects from intersections of the contour line segments by forming a plane for the structural features: estimating vanishing points for each plane of the structural features; and determining the principal directions for each pixel in the plane based on the respective vanishing point for each structural feature.

Aspect 10. The method of any of Aspects 1-9, wherein the one or more horizontal regions are determined by taking an inner product of the normal direction of the pixel with a y-direction of the pixel, wherein when the inner product is greater than 35 degrees, the pixel is determined to be in the horizontal region.

Aspect 11. The method of any of Aspects 1-10, wherein the one or more vertical regions are determined by taking an inner product of the normal direction of the pixel with a y-direction of the pixel, wherein when the inner product is near 90 degrees, the pixel is determined to be in the vertical region.

Aspect 12. The method of any of Aspects 1-11, further comprising: inputting a virtual object in the image based on the refined principal directions of the pixels such that the virtual object follows perspective orientation of the pixels.

Aspect 13. A method for determining perspective directions of pixels in an image, the method comprising: receiving an image: generating two-dimensional geometric regions for objects in the image using a two-dimensional vanishing point estimation: determining a virtual intrinsic for each geometric region based on image size of the object; and determining a normal direction and principal directions for a pixel in the image based on the vanishing point estimation.

Aspect 14. The method of Aspect 13, wherein the two-dimensional geometric regions are generated by user labelling.

Aspect 15. The method of Aspect 13, wherein the two-dimensional geometric regions are generated automatically.

Aspect 16. A non-volatile computer-readable medium having computer-executable instructions stored thereon that, upon execution, cause one or more processors to perform operations comprising: determining principal directions of a pixel in the image: determining a normal direction of the pixel in the image: segmenting regions in the image as one or more horizontal regions and one or more vertical regions based on the normal direction of each pixel in the segmented regions:

obtaining global normalization information for the image from the segmented regions; and refining the principal directions of the pixel in the image based on the global normalization information.

Aspect 17. The non-volatile computer-readable medium according to Aspect 16, wherein determining the principal directions of the pixel includes: generating two-dimensional geometric shapes for objects having the pixel in the image based on contour line segments: providing a virtual intrinsic for each of the objects in the image; and determining the principal directions for the pixels in the objects in the image based on the virtual intrinsic and the contour line segments.

Aspect 18. The non-volatile computer-readable medium according to any of Aspects 16-17, wherein the principal directions include an x-direction and a y-direction representing a pair of orthogonal directions in a three-dimensional space, and wherein the obtaining of the global normalization information includes: estimating a gravity direction for the image by averaging the y-directions of each pixel in the one or more horizontal regions in the image.

Aspect 19. The non-volatile computer-readable medium according to Aspect 18, wherein refining the principal directions of the pixel includes: for the pixel in the one or more vertical regions, replacing the y-direction with the estimated gravity direction for the pixel and replacing the x-direction by taking a cross product of the gravity direction with the normal direction of the pixel.

Aspect 20. The non-volatile computer-readable medium according to Aspect 18, wherein refining the principal directions of the pixel includes: for the pixel in the horizontal regions, replacing the x-direction by taking a cross product of the gravity direction with the determined y-direction and replacing the y-direction by taking the cross product of the gravity direction with the determined x-direction.

Aspect 21. A neural network for refining pixels in an image comprising: an imaging module for receiving an image: a prediction module configured to determine par directions of each pixel in the image and determine a normal direction and a level of uncertainty of the determination of each pixel in the image; a refinement module configured to segment regions in the image as one or more horizontal regions and one or more vertical regions based on the normal direction of each pixel, obtain global normalization information for the image from the segmented regions, and refine the principal directions of each pixel in the image based on the global normalization information; and a rendering module for rending a virtual object in the image having perspective directions of the pixel.

The terminology used in this specification is intended to describe particular embodiments and is not intended to be limiting. The terms "a," "an," and "the" include the plural forms as well, unless clearly indicated otherwise. The terms "comprises" and/or "comprising," when used in this specification, specify the presence of the stated features, integers, steps, operations, elements, and/or components, but do not preclude the presence or addition of one or more other features, integers, steps, operations, elements, and/or components.

With regard to the preceding description, it is to be understood that changes may be made in detail, especially in matters of the construction materials employed and the shape, size, and arrangement of parts without departing from the scope of the present disclosure. This specification and the embodiments described are exemplary only, with the true scope and spirit of the disclosure being indicated by the claims that follow.

The invention claimed is:

1. A method for refining pixels in an image, the method comprising:

determining principal directions of a pixel in the image wherein the principal directions include an x-direction and a y-direction representing a pair of orthogonal directions in a three-dimensional space;

determining a normal direction of the pixel in the image;

segmenting regions in the image as one or more horizontal regions and one or more vertical regions based on the normal direction of each pixel in the segmented regions;

obtaining global normalization information for the image from the segmented regions, including estimating a first gravity direction for the image by averaging the y-directions of each pixel in the one or more horizontal regions in the image; and refining the principal directions of the pixel in the image based on the global normalization information.

2. The method of claim 1, wherein determining the principal directions of the pixel includes:

generating two-dimensional geometric shapes for objects having the pixel in the image based on contour line segments;

providing a virtual intrinsic for each of the objects in the image; and determining the principal directions for the pixel in the objects in the image based on the virtual intrinsic and the contour line segments.

3. The method of claim 2, wherein the two-dimensional geometric shapes are quadrilateral.

4. The method of claim 2, wherein the virtual intrinsic is at a center of the objects and at a focal length with a 45-degree field of view.

5. The method of claim 1, wherein refining the principal directions of the pixel includes:

for the pixel in the one or more vertical regions, replacing the y-direction with the first gravity direction for the pixel and replacing the x-direction by taking a cross product of the first gravity direction with the normal direction of the pixel.

6. The method of claim 1, wherein refining the principal directions of the pixel includes:

for the pixel in the horizontal regions, replacing the x-direction by taking a cross product of the first gravity direction with the determined y-direction and replacing the y-direction by taking the cross product of the first gravity direction with the determined x-direction.

7. The method of claim 1, wherein when the one or more horizontal regions in the image comprises less than a predetermined percentage of a total of the one or more horizontal regions and the vertical regions, the obtaining of the global normalization information includes:

estimating a second gravity direction for the image by taking an average of y-directions from each pixel in the one or more vertical regions.

8. The method of claim 1, wherein the determining of the principal directions includes:

identifying contour line segments in the image;

extracting structural features of objects in the image by identifying edge corners of the objects from intersections of the contour line segments by forming a plane for the structural features;

estimating vanishing points for each plane of the structural features; and determining the principal directions for each pixel in the plane based on the respective vanishing point for each structural feature.

9. The method of claim 1, wherein the one or more horizontal regions are determined by taking an inner product of the normal direction of the pixel with a y-direction of the pixel, wherein when the inner product is greater than 35 degrees, the pixel is determined to be in the horizontal regions.

10. The method of claim 1, wherein the one or more vertical regions are determined by taking an inner product of the normal direction of the pixel with a y-direction of the pixel, wherein when the inner product is within 5 degrees of 90 degrees, the pixel is determined to be in the vertical regions.

11. The method of claim 1, further comprising:

inputting a virtual object in the image based on the refined principal directions of the pixels such that the virtual object follows perspective orientation of the pixels.

12. A non-volatile computer-readable medium having computer-executable instructions stored thereon that, upon execution, cause one or more processors to perform operations comprising:

determining principal directions of a pixel in an image wherein the principal directions include an x-direction and a y-direction representing a pair of orthogonal directions in a three-dimensional space;

determining a normal direction of the pixel in the image;

segmenting regions in the image as one or more horizontal regions and one or more vertical regions based on the normal direction of each pixel in the segmented regions;

obtaining global normalization information for the image from the segmented regions, including estimating a first gravity direction for the image by averaging the y-directions of each pixel in the one or more horizontal regions in the image; and refining the principal directions of the pixel in the image based on the global normalization information.

13. The non-volatile computer-readable medium according to claim 12, wherein determining the principal directions of the pixel includes:

generating two-dimensional geometric shapes for objects having the pixel in the image based on contour line segments;

providing a virtual intrinsic for each of the objects in the image; and determining the principal directions for the pixel in the objects in the image based on the virtual intrinsic and the contour line segments.

14. The non-volatile computer-readable medium according to claim 12, wherein refining the principal directions of the pixel includes:

for the pixel in the one or more vertical regions, replacing the y-direction with the first gravity direction for the pixel and replacing the x-direction by taking a cross product of the first gravity direction with the normal direction of the pixel.

15. The non-volatile computer-readable medium according to claim 10, wherein refining the principal directions of the pixel includes:

for the pixel in the horizontal regions, replacing the x-direction by taking a cross product of the first gravity direction with the determined y-direction and replacing the y-direction by taking the cross product of the first gravity direction with the determined x-direction.

16. A computer-implemented system, comprising:

one or more computers; and one or more computer memory devices interoperably coupled with the one or more computers and having computer-readable storage media storing one or more instructions that, when executed by the one or more computers, perform one or more operations comprising:

determining principal directions of a pixel in an image wherein the principal directions include an x-direction and a y-direction representing a pair of orthogonal directions in a three-dimensional space;

determining a normal direction of the pixel in the image;

segmenting regions in the image as one or more horizontal regions and one or more vertical regions based on the normal direction of each pixel in the segmented regions;

obtaining global normalization information for the image from the segmented regions, including estimating a first gravity direction for the image by averaging the y-directions of each pixel in the one or more horizontal regions in the image; and refining the principal directions of the pixel in the image based on the global normalization information.

17. The system of claim 16, wherein determining the principal directions of the pixel includes:

generating two-dimensional geometric shapes for objects having the pixel in the image based on contour line segments;

providing a virtual intrinsic for each of the objects in the image; and determining the principal directions for the pixel in the objects in the image based on the virtual intrinsic and the contour line segments.

18. The system of claim 17, wherein the two-dimensional geometric shapes are quadrilateral.

19. The system of claim 17, wherein the virtual intrinsic is at a center of the objects and at a focal length at about 45-degree field of view.

20. The system of claim 16, wherein refining the principal directions of the pixel includes:

for the pixel in the one or more vertical regions, replacing the y-direction with the first gravity direction for the pixel and replacing the x-direction by taking a cross product of the first gravity direction with the normal direction of the pixel.

\* \* \* \* \*